United States Patent [19]

Powell

[11] Patent Number: 4,596,683
[45] Date of Patent: Jun. 24, 1986

[54] TAXIDERMY MOLD WITH METHOD OF ALIGNING AND LOCKING ARTIFICIAL EYES INTO THE CORRECT POSITION FOR MOLDING A TAXIDERMY FORM

[75] Inventor: Leon T. Powell, Salisbury, N.C.

[73] Assignee: McKenzie Taxidermy Supply, Inc., Granite Quarry, N.C.

[21] Appl. No.: 766,150

[22] Filed: Aug. 16, 1985

[51] Int. Cl.$^4$ .................. B29C 65/00; B29C 39/10; B29C 39/26; B29C 33/00
[52] U.S. Cl. .................................. 264/46.4; 249/96; 264/261; 264/271.1; 264/275; 264/277; 425/123; 425/817 R
[58] Field of Search ............. 264/259, 261, 275 R, 264/277, 278, 271.1, 279.1, 46.4, 46.6; 249/83, 85, 88, 94, 96; 425/123, 817 R

[56] References Cited

U.S. PATENT DOCUMENTS

| | | | |
|---|---|---|---|
| 996,783 | 7/1911 | Moreau | 264/271.1 |
| 3,106,040 | 10/1963 | Ostrander | 264/278 |
| 4,432,919 | 2/1984 | Rinehart | 264/46.4 |
| 4,515,340 | 5/1985 | Rinehart | 249/96 |

Primary Examiner—Willard E. Hoag
Attorney, Agent, or Firm—W. Thad Adams, III

[57] ABSTRACT

A taxidermy mold is disclosed which includes an eye socket recess (13) into which an artificial eye (20) is inserted and locked into position. Locking takes place by means of two diametrically opposed lugs (14) and (15) which mate with two diametrically opposed notches (26) and (27) in artificial eye (20). Alignment is maintained while a hardenable liquid foam is poured into the mold to create a taxidermy form (30) having molded eyes therein.

6 Claims, 7 Drawing Figures

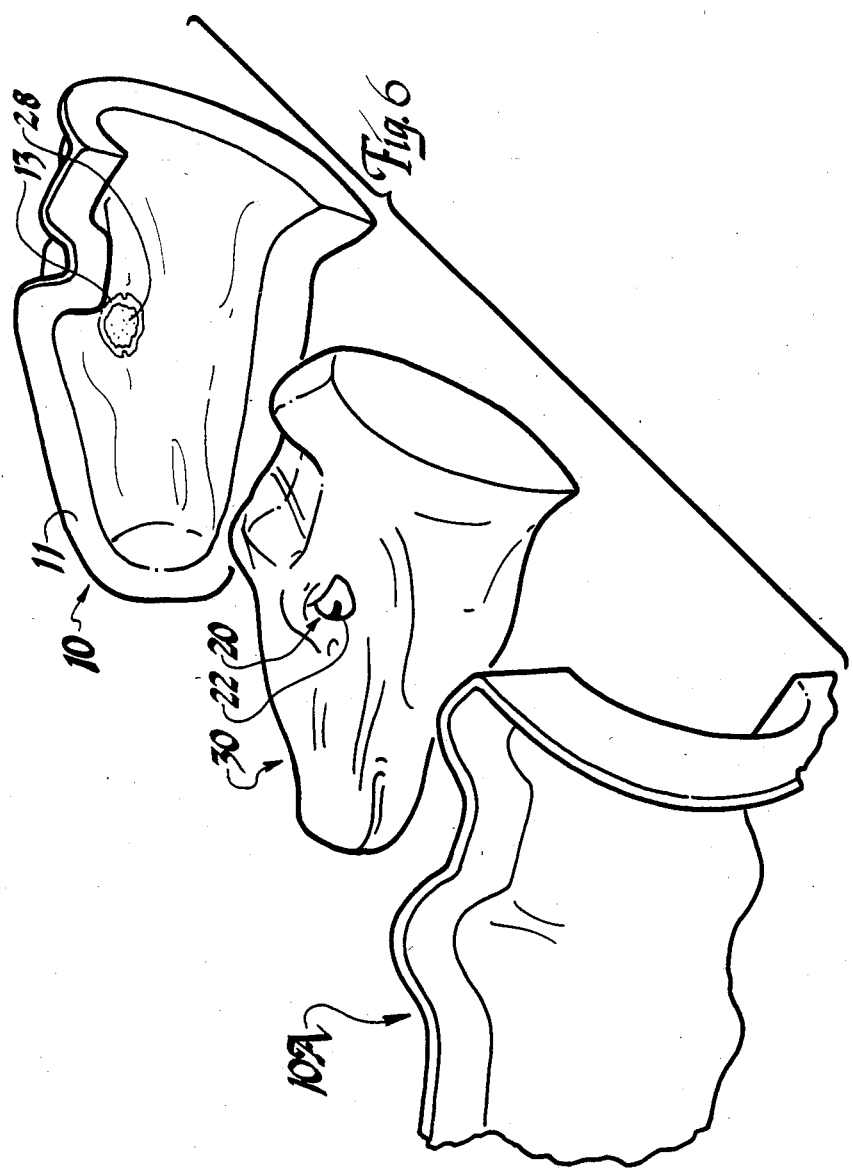

TAXIDERMY MOLD WITH METHOD OF ALIGNING AND LOCKING ARTIFICIAL EYES INTO THE CORRECT POSITION FOR MOLDING A TAXIDERMY FORM

TECHNICAL FIELD AND BACKGROUND OF THE INVENTION

This invention relates to a taxidermy mold which includes a method of aligning and locking artificial eyes into the correct position for molding a taxidermy form. The taxidermy form is then used by a taxidermist on which to mount an animal skin, such as from a deer. The end product is typically mounted on a wall as a trophy. Obviously, the taxidermist desires to make the trophy as lifelike as possible. For this reason, very carefully manufactured glass or plastic eyes are inserted into a socket formed in the taxidermy form.

One way of accomplishing this was for the taxidermist himself to insert the eyes into the sockets of the completed form at the same time as he applied the skin. This was the procedure invariably followed in the past and still used by many taxidermists today. However, this procedure is time consuming and relatively complicated. Since most glass eyes include a pupil, care must be taken to properly align the pupil in relation to the mold so that the eye appears to be as natural and lifelike as possible. There are a number of axes on which the eye must be properly aligned for it to appear lifelike and to constitute a correct anatomical representation of a deer.

Because of the time and expense required and lack of consistently accurate results achieved by taxidermist-inserted eyes, some manufacturers of taxidermy forms now mold the eye into the form at the same time as the form itself is poured. The form is made by pouring hardenable polyurethane foam liquid into a cavity formed by two mold parts which are placed together. Recesses are provided in the interior walls of the mold parts and an eye is releasably secured to each of the recesses. The rear of each eye projects outwardly into the cavity. As the liquid hardens, the eye is molded into the taxidermy form.

For this procedure to work, the eye must be properly aligned so that when the skin is applied to the taxidermy form, the eyes appear in their natural and anatomically correct position. This is difficult to do, since, when the eye is inserted into the recess in the interior wall of the mold parts, the outer surface of the eye cannot be seen. Therefore the pupil of the eye cannot be oriented to its proper position solely by observation.

A first step in assisting the manufacturer of the taxidermy form to properly insert the eyes for molding into the form is represented by the Rinehart U.S. Pat. No. 4,515,340. This patent discloses a taxidermy mold and molding method for making a taxidermy mannikin wherein each of the eye socket recesses is immediately surrounded by a correctly contoured surface having reference indicia markings. Specifically, ridges are molded into the mold parts adjacent the eye recess and the eye is intended to be inserted into the recess. The long axis of the pupil is aligned with two of the opposing ridges and the short axis of the pupil aligned with the other two. This is most clearly shown in FIGS. 1 and 2 of Rinehart '340. While this aligning technique is certainly easier than aligning purely by observation, a degree of subjectivity and variation is still necessary. In practice, this method is not proven particularly satisfactory since the alignment of the pupil with the ridges must be exact.

SUMMARY OF THE INVENTION

Therefore, it is an object of the invention to provide a taxidermy mold with means for aligning and locking artificial eyes into correct position for molding a taxidermy form.

It is another object of the invention to provide a taxidermy mold wherein an artificial eye is automatically positioned in correct alignment upon insertion of the eye socket recess of the mold.

It is a further object of the invention to provide a method of aligning and locking artificial eyes into a correct anatomical position for molding a taxidermy form.

These and other objects of the present invention are achieved in the preferred embodiments disclosed below by providing a taxidermy mold with means for aligning and locking artificial eyes into correct position for molding a taxidermy form. The taxidermy mold comprises a pair of opposing, complementary mold parts adapted to fit together to form a cavity. Each mold part has interior walls defining an anatomically correct internal shape for forming an anatomically correct taxidermy form upon the introduction of a hardenable foaming liquid into the cavity.

An eye socket recess is formed in the interior walls of each of the mold parts. The recess is shaped to receive a front part of one of the artificial eyes while leaving an exposed rear part of the eye extending into the mold cavity for being molded into the hardened foam of the taxidermy form. Eye locking means are formed into the interior walls of each of the mold parts immediately adjacent the eye socket recess and are adapted to mate with complementary eye locking means formed into the artificial eye. The eye locking means on the interior walls of the mold parts and the complementary eye locking means of the eye are positioned so as to lock the eye into correct anatomical orientation and also lock against rotation in the eye socket recess.

According to a preferred embodiment of the invention, the eye locking means comprises at least one lug carried on the edge of the eye socket recess and adapted to mate with a complementary notch in the rear edge of the artificial eye.

In the method according to the invention, the eyes are aligned and locked into correct anatomical position by first providing a pair of opposing, complementary mold parts adapted to fit together to form a cavity. Each mold part has interior walls defining an anatomically correct internal shape for forming an anatomically correct taxidermy form. Each of the mold parts is provided with an eye socket recess in the interior walls thereof.

The recess is shaped to receive a front part while leaving an exposed rear part extending into the mold cavity for being molded into the hardened foam. Eye locking means are provided and are formed into the interior walls of each of the mold parts immediately adjacent the eye socket recess and are adapted to mate with complementary eye locking means formed into an artificial eye. An artificial eye is inserted into each eye socket recess and rotated until the eye locking means and the complementary eye locking means mate. A hardenable foaming liquid is then introduced into the mold cavity. After the foam is hardened, the opposing, complementary mold parts are removed to expose an anatomically correct taxidermy form having properly aligned artificial eyes molded therein.

BRIEF DESCRIPTION OF THE DRAWINGS

Some of the objects of the invention have been set forth above. Other objects and advantages of the invention will appear as the description of the invention proceeds when taken in conjunction with the following drawings, in which:

FIG. 6 is an exploded, fragmentary view of the mold; and

DESCRIPTION OF THE PREFERRED EMBODIMENT

Figure 1:
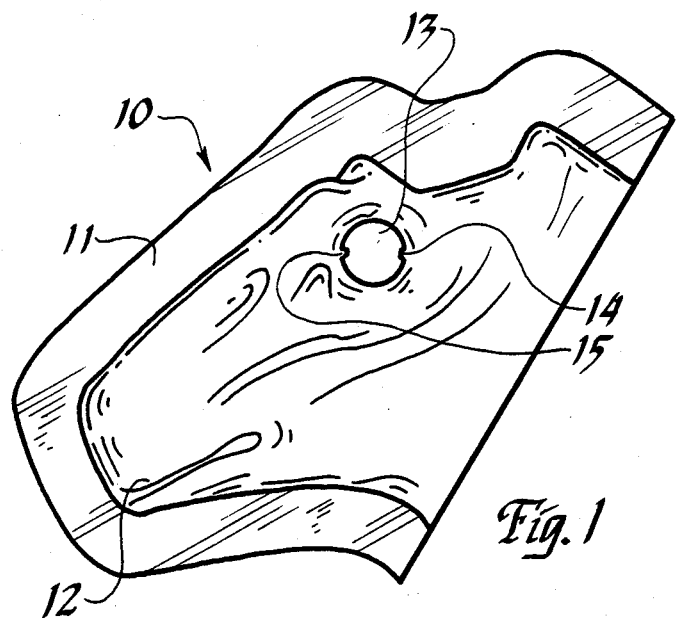
FIG. 1 is a view of the inside of one of the two complementary mold parts of the mold, from which the taxidermy form is molded.
Figure 7:
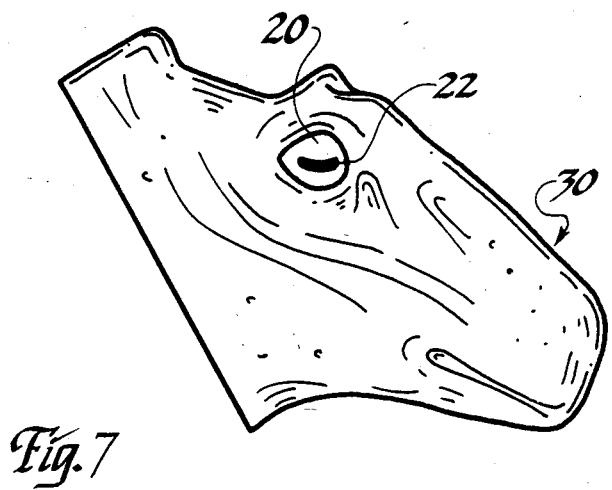
FIG. 7 is a view of a taxidermy form molded from the mold part shown in FIG. 1.

Referring now specifically to the drawings, one half of a taxidermy mold, comprising a taxidermy mold part is shown and generally designated at reference numeral 10. The mold part shown in FIG. 1 is the right-hand mold part. A left-hand mold part 10A is also utilized and is shown fragmentarily in FIG. 6. Since both mold parts 10 and 10A are functionally identical, further explanation will be with reference to the mold part 10, it being understood that the explanation applies also to mold part 10A.

Figures 2, 4:
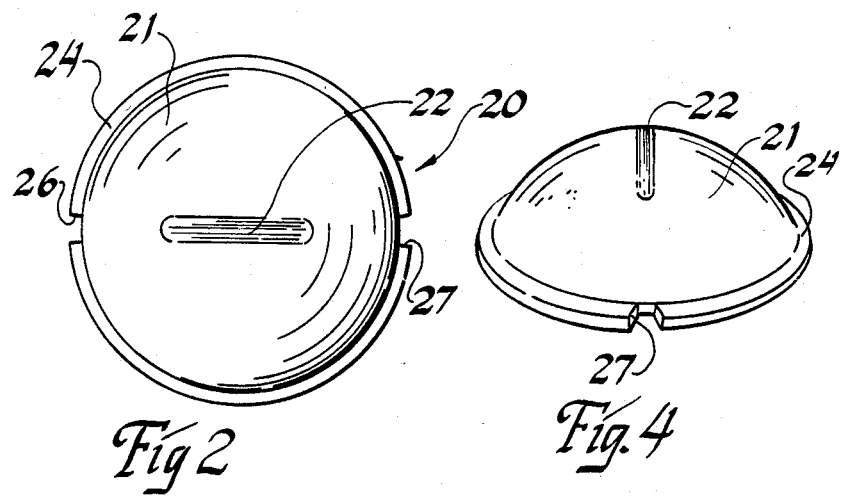
FIG. 2 is a top plan view of an artificial eye in accordance with the present invention.
FIG. 4 is a perspective view of the eye shown in FIG. 2.

Mold part 10 comprises a planar flange 11 which substantially surrounds interior walls 12 of mold part 10. Interior walls 12 define an anatomically correct internal shape which, when mated with the left-hand mold part 10A defines a cavity into which a hardenable polyurethane foaming liquid is introduced. The internal walls of mold part 10 also include an eye socket recess 13. Eye socket recess 13 is substantially semispherical in shape and conforms to the ball of an artificial eye 20 (FIGS. 2 and 4). Still referring to FIG. 1, two lugs 14 and 15 are integrally formed into mold part 10 on the edge of and extending into eye socket recess 13. Preferably, lugs 14 and 15 are diametrically opposed.

Referring now to FIG. 2, an artificial eye 20 of the type used to practice the present invention is shown.

Eye 20 comprises a semispherical concentric positive meniscus body 21 having an outer convex surface and inner concave surface. Eye 20 has a rod-shaped elongate pupil 22 molded therein. Eye 20 also is provided with a substantially circular flange 24 which is interrupted by two notches 26 and 27 formed therein. With concurrent reference to FIGS. 1 and 2, notches 26 and 27 are adapted to be positioned in locking relationship with lugs 14 and 15 which extend into eye socket recess 13.

If desired, lugs 14 and 15 can be made somewhat smaller than notches 26 and 27. This will permit some of the liquid foam to run into the remaining space in notches 26 and 27 and harden. Therefore, when mold part 10 is removed, the hardened foam itself forms a lug which assists in maintaining eye 20 in proper position.

Figure 3:
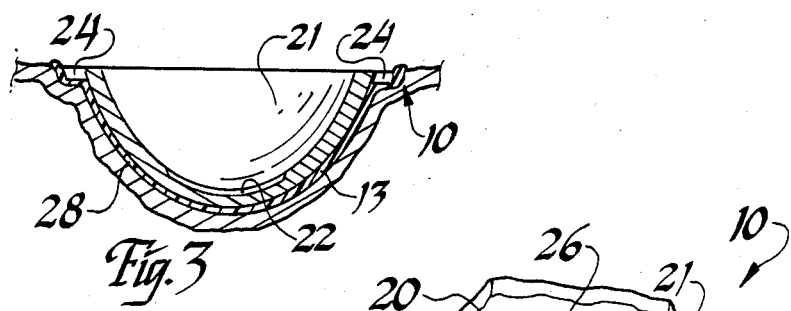
FIG. 3 is a vertical cross-sectional view taken through the eye socket recess portion of the taxidermy mold shown in FIG. 1 with the eye shown in FIG. 2 in correct position therein.
Figure 5:
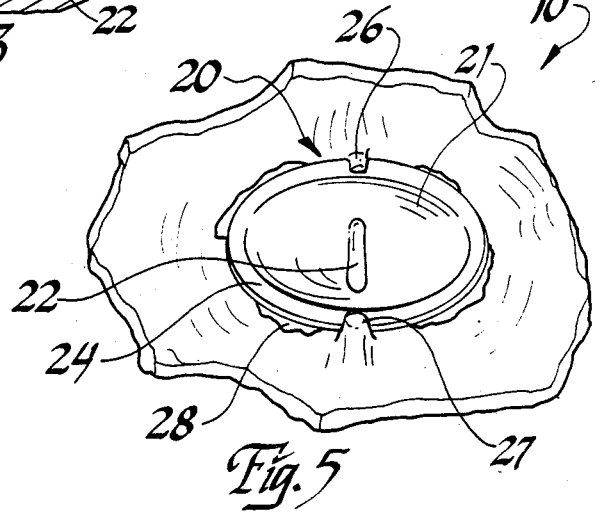
FIG. 5 is a fragmentary perspective view of the portion of the internal wall of the mold part shown in FIG. 1, with the eye in proper position therein.

Referring now to FIG. 3, an adhesive 28 is desirable in many cases to assist in holding eye 20 in eye socket recess 13 during molding. The adhesive 28 may suitably comprise a variety of different adhesive substances. Of course, it is preferable that the adhesive 28 either not stick to the surface of eye 20 or be easily removable therefrom. In addition to holding eye 20 within eye socket recess 13 during molding, the adhesive 28 also provides a seal which prevents the liquid foam from running to minute spaces between the surface of eye 20 and eye socket recess 13.

Once mold parts 10 and 10A are removed (see FIG. 6), the hardened foam holds eye 20 in its proper position.

A view of the completed taxidermy mold is shown in FIG. 6 and designated by reference numeral 30. As is shown, the portion of eye 20 which was in direct contact with eye socket recess 13 is visible. The pupil 22 is properly aligned in the form. This method also makes it unnecessary for the taxidermist to fill in the eye socket with a plastic or clay-like substance, as is required when the taxidermist himself inserts the eye into the mold. Therefore, a substantial amount of time and effort is saved the taxidermist, while achieving uniformly accurate results.

A taxidermy mold with means for aligning and locking artificial eyes into correct position for molding a taxidermy form and a method of aligning and locking artificial eyes into a correct anatomical position for molding a taxidermy form are described above. Various details of the invention may be changed without departing from its scope. Furthermore, the foregoing description of the preferred embodiment according to the present invention is provided for the purpose of illustration only and not for the purpose of limitation—the invention being defined by the claims.

I claim:

1. A taxidermy mold with means for aligning and locking artificial eyes into correct position for molding a taxidermy form, said taxidermy mold comprising:
   a. a pair of opposing, complementary mold parts adapted to fit together to form a cavity, each mold part having interior walls defining an anatomically correct internal shape for forming an anatomically correct taxidermy form upon the introduction of a hardenable foaming liquid into the cavity;
   b. an eye socket recess formed in the interior walls of each of the mold parts, said recess shaped to receive a front part of one artificial eye while leaving an exposed rear part in the mold cavity for being molded into the hardened foam of the taxidermy form;
   c. eye locking means-formed into the interior walls of each of the mold parts immediately adjacent the eye socket recess and being such as to mate with complementary eye locking means formed into the artificial eye, said eye locking means and the complementary eye locking means being so positioned on the respective mold part and eye so as to lock the eye into the correct anatomical orientation and also lock the eye against rotation in said recess.

2. A taxidermy mold according to claim 1, wherein said eye locking means comprises at least one lug carried on the edge of the eye socket recess, and being such as to mate with complementary eye locking means having at least one notch in the rear edge of the artificial eye adapted to receive said lug.

3. A taxidermy mold according to claim 1, wherein said eye locking means comprise two lugs carried on diametrically opposing edges of the eye socket recess and being such as to mate with complementary eye locking means having a pair of notches carried in diametrically opposing relation on the rear edge of said artificial eye.

4. A method of aligning and locking artificial eyes into a correct anatomical position for molding a taxidermy form, and comprising the steps of:
 a. providing a pair of opposing, complementary mold parts adapted to fit together to form a cavity, each mold part having interior walls defining an anatomically correct internal shape for forming an anatomically correct taxidermy form;
 b. providing in each of the mold parts an eye socket recess in the interior walls thereof, said recess being shaped to receive a front part while leaving an exposed rear part in the mold cavity for being molded into the hardened foam;
 c. providing eye locking means formed into the interior walls of each of the mold parts immediately adjacent the eye socket recess and adapted to mate with complementary eye locking means formed into an artificial eye;
 d. inserting an artificial eye into each eye socket recess and rotating each eye until the eye locking means and the complementary eye locking means mate;
 e. introducing a hardenable foaming liquid the mold cavity; and
 f. removing the opposing, complementary mold parts after the foam has hardened to expose an anatomically correct taxidermy form having properly aligned artificial eyes molded therein.

5. A method according to claim 4, wherein said artificial eye includes a pupil in the form of an elongate, rod-shaped body molded into the artificial eye, and the eye locking means and complementary eye locking means are formed respectively so that when mated the pupil of the eye assumes a correct anatomical position.

6. A method according to claim 5, wherein the steps of inserting and rotating the eye includes the step of mating a lug adjacent the eye recess with a notch in the eye.

* * * * *